(12) United States Patent
Kuritzky et al.

(10) Patent No.: US 8,516,138 B2
(45) Date of Patent: Aug. 20, 2013

(54) MULTIPLE AUTHENTICATION SUPPORT IN A SHARED ENVIRONMENT

(75) Inventors: Matt R. Kuritzky, Poughkeepsie, NY (US); Fabian F. Morgan, Austin, TX (US); Sandra J. Schlosser, Austin, TX (US); Sarah V. White Eagle, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 288 days.

(21) Appl. No.: 12/873,012

(22) Filed: Aug. 31, 2010

(65) Prior Publication Data

US 2012/0054357 A1 Mar. 1, 2012

(51) Int. Cl.
*G06F 15/16* (2006.01)

(52) U.S. Cl.
USPC ......................................................... 709/229

(58) Field of Classification Search
USPC ......................................................... 709/229
See application file for complete search history.

(56) References Cited

U.S. PATENT DOCUMENTS

| | | | |
|---|---|---|---|
| 6,148,405 A | 11/2000 | Liao et al. | |
| 6,219,790 B1 | 4/2001 | Lloyd et al. | |
| 6,385,615 B1 | 5/2002 | Haeri et al. | |
| 6,697,824 B1* | 2/2004 | Bowman-Amuah | 709/229 |
| 6,826,696 B1 | 11/2004 | Chawla et al. | |
| 7,111,321 B1* | 9/2006 | Watts et al. | 726/2 |
| 7,194,547 B2 | 3/2007 | Moreh et al. | |
| 7,237,030 B2 | 6/2007 | Chakraborty et al. | |
| 7,320,074 B2 | 1/2008 | Eggebraaten et al. | |
| 7,512,965 B1 | 3/2009 | Amdur et al. | |
| 7,577,132 B2 | 8/2009 | Katz et al. | |
| 7,693,507 B2 | 4/2010 | Suzuki et al. | |
| 2002/0083178 A1 | 6/2002 | Brothers | |
| 2003/0033524 A1 | 2/2003 | Tran et al. | |
| 2003/0055935 A1* | 3/2003 | Tarrant et al. | 709/223 |
| 2006/0020682 A1 | 1/2006 | Kiran | |
| 2006/0168255 A1* | 7/2006 | Katz et al. | 709/229 |
| 2007/0022286 A1 | 1/2007 | Makni | |
| 2008/0072053 A1 | 3/2008 | Halim | |

(Continued)

FOREIGN PATENT DOCUMENTS

JP 2008/287359 A 11/2008

OTHER PUBLICATIONS

Mrudul Uchil "Authentication Service Architecture", dated 2005.*
BEAWebLogic Server® Securing WebLogic Server, dated May 2007.*

(Continued)

*Primary Examiner* — Boris Gorney
(74) *Attorney, Agent, or Firm* — Arthur Samodovitz; Robert C. Rolnik (57) ABSTRACT

An authentication configurator may define a LDAP security group for LDAP authentication, wherein the LDAP security group is associated with rights. It may define a native security group for native authentication users, wherein the native authentication group has at least one right not present in the LDAP security group, and define customer-specified LDAP chains. It may configure an LDAP authentication web application and a native authentication web application, wherein the LDAP authentication web application and the native authentication web application each connect to a service management database, and the LDAP authentication web application uses the customer-specified LDAP chains. A first Uniform Resource Locator (URL) for LDAP authentication to access the LDAP authentication web application and a second URL for native authentication to access the native authentication web application may also be configured. It may assess the authentication requirements of a customer and create a user identifier, responsive to assessing.

3 Claims, 5 Drawing Sheets

(56) References Cited

U.S. PATENT DOCUMENTS

| | | |
|---|---|---|
| 2008/0098460 A1 | 4/2008 | Jain |
| 2008/0155662 A1 | 6/2008 | Vykunta |
| 2008/0155682 A1* | 6/2008 | Vykunta .................. 726/21 |
| 2009/0165096 A1 | 6/2009 | Hughes et al. |
| 2009/0187758 A1 | 7/2009 | Fujii et al. |
| 2009/0217354 A1 | 8/2009 | Blum et al. |
| 2009/0276838 A1* | 11/2009 | Bennett et al. .................. 726/7 |
| 2010/0043054 A1* | 2/2010 | Kidwell .................. 726/2 |
| 2010/0064353 A1* | 3/2010 | Kan et al. .................. 726/5 |
| 2010/0122327 A1 | 5/2010 | Linecker et al. |

OTHER PUBLICATIONS

Tang, J., et al; A design for single-sign-on system . . . ; Journal: Microcomputer Information, No. 3; Date: 2009; pp. 216-217, 225; Microcomputer Information; China.

* cited by examiner

MULTIPLE AUTHENTICATION SUPPORT IN A SHARED ENVIRONMENT

BACKGROUND OF THE INVENTION

1. Field of the Invention

The present invention relates generally to a computer implemented method, data processing system, and computer program product for providing authentication. More specifically, the present invention relates to permitting heterogeneous authentication methods to function in a common shared environment.

2. Description of the Related Art

A service management environment is the combined hardware, networking, and software features of an information technology (IT) system tied together by relationships, often expressed in contracts, that provide a customer's employees access to IT resources. Businesses rely on flexible staffing solutions to staff their workflow in a manner that optimizes staff and other resource utilization. Occasionally, such staffing requires use of remote staff, partners, and contractors to deliver IT services within the service management environment.

As a customer or business rotates through, adds, and deletes vendors from its trusted group of suppliers, a customer may rely on a variety of authenticating repositories hosted on servers. However, rapid growth of a customer via, for example, acquisitions of smaller businesses, can create a patchwork set of IT service vendors. Each vendor may rely on a different repository or database.

The data within each repository is not readily integrated into others using prior art tools. Accordingly, a remedy is sought.

SUMMARY OF THE INVENTION

The present invention provides a computer implemented method, computer system, and computer program product for supporting multiple authentication routes for customers. An authentication configurator may define a Lightweight Directory Access Protocol (LDAP) security group for LDAP authentication, wherein the LDAP security group is associated with authentication rights. The authentication configurator may define a native security group for native authentication users, wherein the native authentication group has at least one authentication right not present in the LDAP security group. The authentication configurator may define customer-specified LDAP chains. The authentication configurator may configure an LDAP authentication web application and a native authentication web application, wherein the LDAP authentication web application and the native authentication web application each connect to a service management database, and the LDAP authentication web application uses the customer-specified LDAP chains. The authentication configurator may configure a first Uniform Resource Locator (URL) for LDAP authentication to access the LDAP authentication web application. It may configure a second URL for native authentication to access the native authentication web application. The authentication configurator may assess the authentication requirements of a customer. The authentication configurator may create a user identifier, responsive to assessing.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
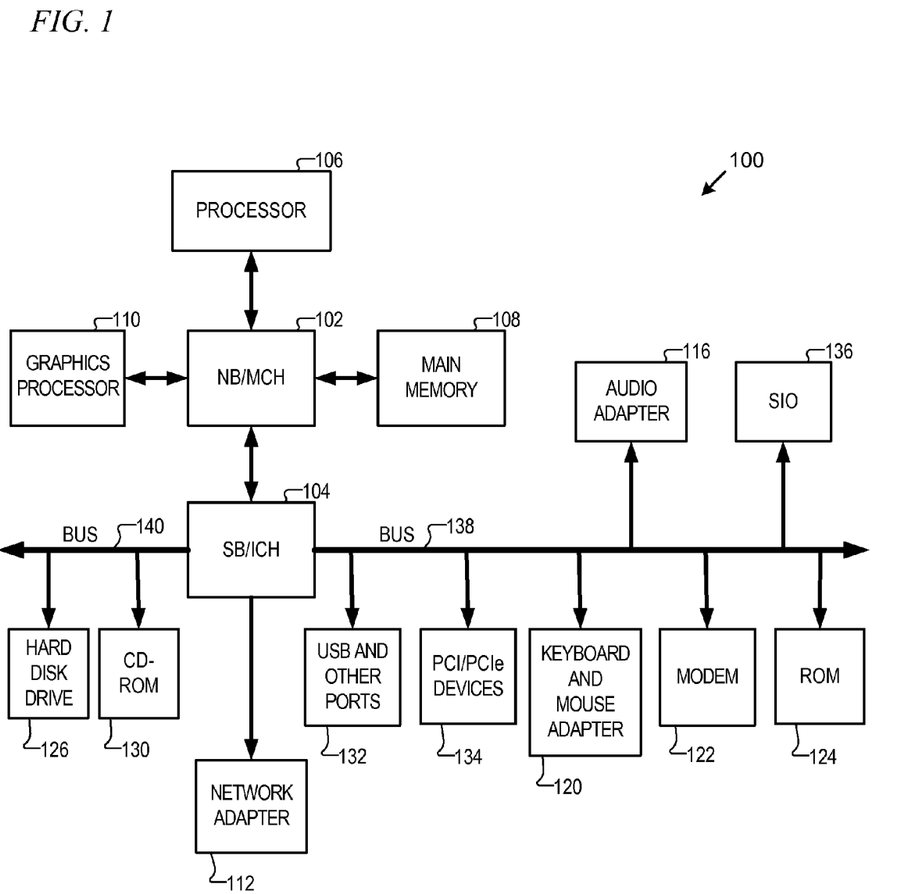
FIG. 1 is a block diagram of a data processing system in accordance with an illustrative embodiment of the invention.

With reference now to the figures and in particular with reference to FIG. 1, a block diagram of a data processing system is shown in which aspects of an illustrative embodiment may be implemented. Data processing system 100 is an example of a computer system, in which code or instructions implementing the processes of the present invention may be located. In the depicted example, data processing system 100 employs a hub architecture including a north bridge and memory controller hub (NB/MCH) 102 and a south bridge and input/output (I/O) controller hub (SB/ICH) 104. Processor 106, main memory 108, and graphics processor 110 connect to north bridge and memory controller hub 102. Graphics processor 110 may connect to the NB/MCH through an accelerated graphics port (AGP), for example.

In the depicted example, local area network (LAN) adapter 112 connects to south bridge and I/O controller hub 104 and audio adapter 116, keyboard and mouse adapter 120, modem 122, read only memory (ROM) 124, hard disk drive (HDD) 126, CD-ROM drive 130, universal serial bus (USB) ports and other communications ports 132, and PCI/PCIe devices 134 connect to south bridge and I/O controller hub 104 through bus 138 and bus 140. PCI/PCIe devices may include, for example, Ethernet adapters, add-in cards, and PC cards for notebook computers. PCI uses a card bus controller, while PCIe does not. ROM 124 may be, for example, a flash binary input/output system (BIOS). Hard disk drive 126 and CD-ROM drive 130 may use, for example, an integrated drive electronics (IDE) or serial advanced technology attachment (SATA) interface. A super I/O (SIO) device 136 may be connected to south bridge and I/O controller hub 104.

An operating system runs on processor 106, and coordinates and provides control of various components within data processing system 100 in FIG. 1. The operating system may be a commercially available operating system such as Microsoft® Windows® XP. Microsoft and Windows are trademarks of Microsoft Corporation in the United States, other countries, or both. An object oriented programming system, such as the Java programming system, may run in conjunction with the operating system and provides calls to the operating system from Java™ programs or applications executing on data processing system 100. Java is a trademark of Sun Microsystems, Inc. in the United States, other countries, or both.

Instructions for the operating system, the object-oriented programming system, and applications or programs are located on storage devices, such as hard disk drive 126, and may be loaded into main memory 108 for execution by processor 106. The processes of the present invention can be performed by processor 106 using computer implemented instructions, which may be located in a memory such as, for example, main memory 108, read only memory 124, or in one or more peripheral devices.

Those of ordinary skill in the art will appreciate that the hardware in FIG. 1 may vary depending on the implementation. Other internal hardware or peripheral devices, such as flash memory, equivalent non-volatile memory, and the like, may be used in addition to or in place of the hardware depicted in FIG. 1. In addition, the processes of the illustrative embodiments may be applied to a multiprocessor data processing system.

In some illustrative examples, data processing system 100 may be a personal digital assistant (PDA), which is configured with flash memory to provide non-volatile memory for storing operating system files and/or user-generated data. A bus system may be comprised of one or more buses, such as a system bus, an I/O bus, and a PCI bus. Of course, the bus system may be implemented using any type of communications fabric or architecture that provides for a transfer of data between different components or devices attached to the fabric or architecture. A communication unit may include one or more devices used to transmit and receive data, such as a modem or a network adapter. A memory may be, for example, main memory 108 or a cache such as found in north bridge and memory controller hub 102. A processing unit may include one or more processors or CPUs. The depicted example in FIG. 1 is not meant to imply architectural limitations. For example, data processing system 100 also may be a tablet computer, laptop computer, or telephone device in addition to taking the form of a PDA.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable storage device. The term "computer readable storage device" does not encompass a signal propagation media. A computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage device may be any tangible device that can store a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The illustrative embodiments permit an organization or customer to flexibly change their staffing configuration, or alternatively, a service organization to respond to varying staff configurations of customers in a flexible manner. For example, staff that are already described on an authentication server that is a native authentication server can be authenticated to a web application while contemporaneously authenticating staff that are described on a Lightweight Directory Access Protocol (LDAP) authentication server.

A customer is a business entity or individual who consumes information technology (IT) services. A customer may include owners, managers, and employees of the business entity.

An LDAP authentication web application is an application that is assigned to or constructed to perform with an LDAP server for purposes of authenticating users. A native authentication web application is an application that is assigned to or constructed to perform with a native authentication server for purposes of authenticating users. A web application can be either an LDAP authentication web application or a native authentication web application.

Figure 2:
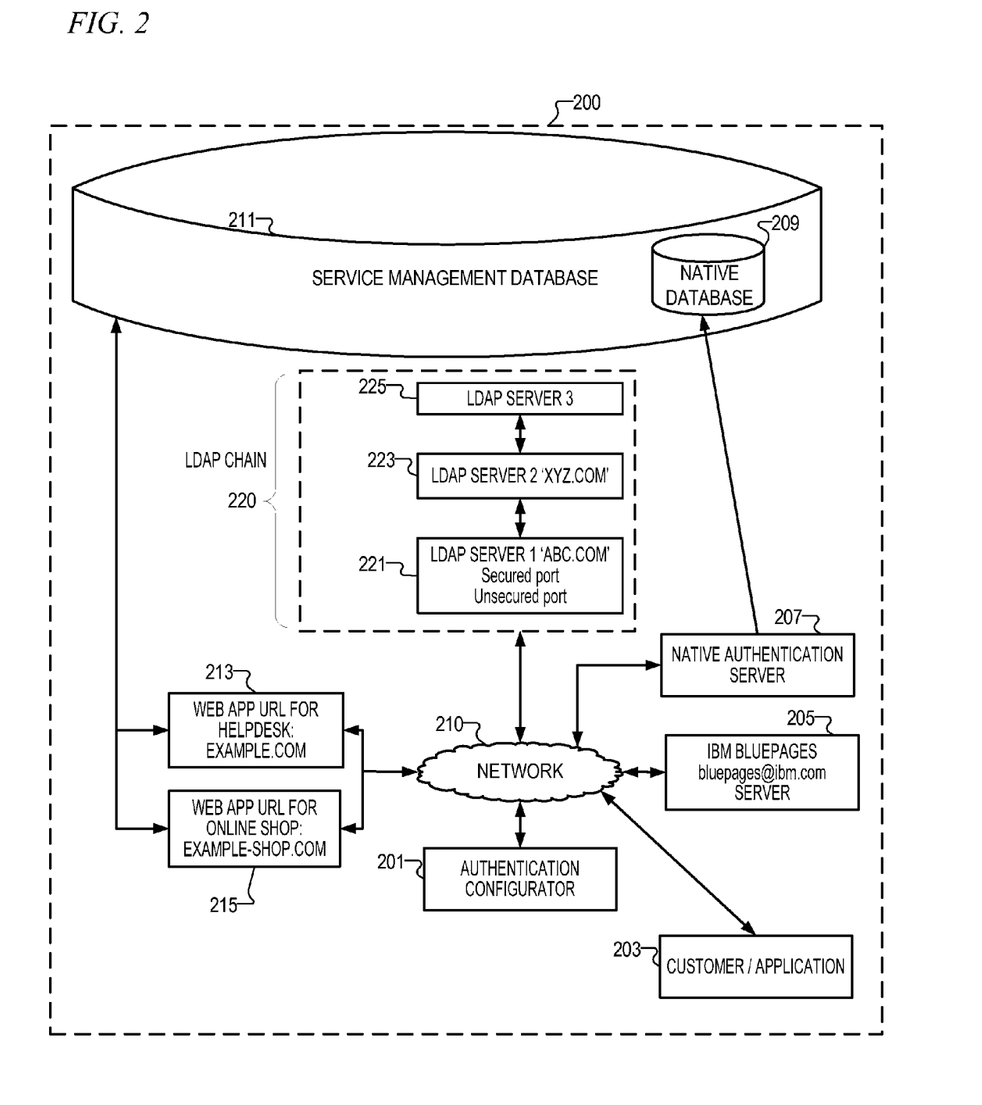
FIG. 2 is a block diagram of a network architecture featuring an authentication configurator in accordance with an illustrative embodiment of the invention.

FIG. 2 is a block diagram of a network architecture featuring an authentication configurator in accordance with an illustrative embodiment of the invention. The network architecture may be a service management environment 200. A service management environment is the components owned or otherwise controlled by an information technology support organization. An example of an information technology support organization is International Business Machines Corporation. As such, the data processing systems in the service management environment include authentication configurator 201, customer/application 203, web application URL 213, web application URL 215, and native authentication server 207. In addition, service management database 211 and native database 209 are also within the service management environment. Any component managed by the organization is an internal component. All other components are external components. A component is a data processing system having a network address and operable to exchange information with other data processing systems. A service management environment is the combined hardware, networking, and software features of an information technology (IT) system tied together by relationships, often expressed in contracts that provide a customer's employees access to IT resources. Authentication configurator may be a data processing system, for example, data processing system 100 of FIG. 1. Authentication configurator 201 receives configuration directly or indirectly from a customer, performing via application 203. Application 203 may be a browser, terminal session, or any other manner that permits a user to operate a user interface hosted at a remote server, in this case authentication configurator 201.

Network 210 may provide interconnect between and among servers, clients, and other logical entities hosted on data processing systems. For example, client may rely on a web application for helpdesk functionality in support of its staff. Accordingly, web application for helpdesk 213 may interconnect to customer/application 203 via network 210. In addition, web application for online shop 215 may interconnect to customer/application 203 via network 210. Each such web application may rely on data, owned, or controlled by the customer, in this case, service management database 211. Service management database 211 is a database used by a customer to support a web application. A web application may be a data processing system that executes software to serve content over a network such as the Internet or an intranet.

A web application may be hosted at a customer uniform resource locator (URL). A customer URL is a uniform resource locator that references a data processing system that hosts a web application of the customer. The URL may be, for example, an internet protocol address, a domain name, and/or a path to a file.

Each application among 213 and 215 may be staffed or otherwise supported by people that are authorized by varying means. For example, a customer may have a vendor that has vendor employees that provide support for helpdesk functions. The vendor, under agreement, may have access to both applications 213 and 215. Such staff may be authenticated and authorized according to authentication server, LDAP Server 1 221. However, the customer may have employees who are authenticated and authorized according to native authentication server 207. Such employees may be described in native database 209 which native authentication server 207 uses to validate or reject incoming access requests for web application 215 used for an online shop. Native database 209 may be independent of service management database 211, or, as depicted here, native database 209 may be a data structure stored in a common memory or storage of the service management database 211. Nevertheless, in embodiments where the native database is independent of the service management database, the service management database can be stored local to a native authentication server.

In addition, the customers may rely on external staff who themselves are authenticated using a LDAP server. The customer may rely on staff from a company such as International Business Machines Corporation, for example, to initially set up hardware and tunable variables in web application 215. As such, a database of IBM staff may be used via IBM BluePages server 205. IBM is a registered trademark of International Business Machines Corporation. IBM BluePages server may be an authentication server configured according to LDAP standards. Alternatively, an OpenLDAP™ software based server may provide LDAP service in place of IBM BluePages server 205. OpenLDAP is a trademark of the OpenLDAP Foundation. It is appreciated that a range of options for selecting LDAP servers beyond an IBM BluePages server and an OpenLDAP server, and that these types of LDAP servers are described only as examples.

Further flexibility may be developed by relying on additional LDAP servers in a hierarchy. An LDAP chain is a hierarchy or list of LDAP servers that are used to successively reject a login attempt or request for authentication until one of the LDAP servers in the chain or list grants authentication. It is appreciated that a first LDAP server in such an LDAP chain may receive a correct login and password. Accordingly, zero LDAP servers will reject such an authentication.

An LDAP chain is shown logically as LDAP chain 220. Logically, FIG. 2 shows the LDAP chain configured to first check with LDAP server 1 221, and fall back to LDAP server 2 223 and LDAP server 3 225 if the login and/or password are incorrect according to the earlier or higher-priority listed LDAP servers.

Each of the LDAP servers has a corresponding data store that may operate as an authentication database. An authentication database is the data, serialized or stored, that provides criteria for authenticating one or more users. The authentication database may be stored to memory in an authentication server, where the authentication server executes code in response to authentication queries in order to look-up a match to either data within the authentication database, or to keys produced based on data within the authentication database. Examples of the authentication databases can be the authentication data stores associated with each LDAP server. Alternatively, an authentication database may be native database 209.

A security group is a name used in a computer system to bundle one or more users and even applications together for purposes of assigning authorizations to access various services of the computer system. Accordingly, a security group can correspond to a job function, an organization, a rank or any other common attribute among the users/entities controlled/served by the service.

Figure 3A:
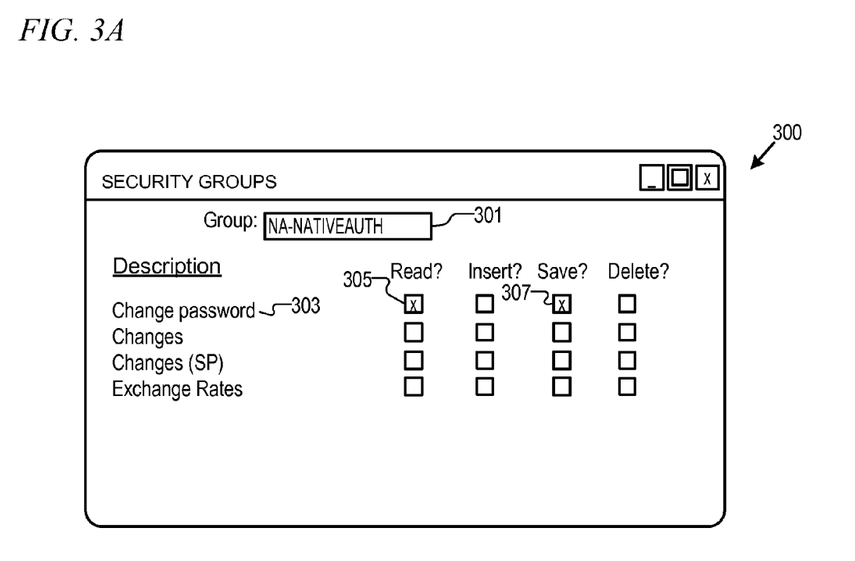
FIG. 3A is a user interface for defining a native authentication security group in accordance with an illustrative embodiment of the invention.

FIG. 3A is a user interface for defining a native authentication security group in accordance with an illustrative embodiment of the invention. User interface 300 may be used to set native authentication security groups in native authentication server 207 of FIG. 2. A native security group is a security group defined according to specifications other than the LDAP standard. For example, a native security group can have an authentication right to change a password. The authentication right to change a password is not present in LDAP security groups using a component within the service management environment. In contrast, native authentication users can change their passwords using a component within or internal to the service management environment. A native security group can be established according to the conventions or needs of a customer.

In the process of boarding to a heterogeneous service management environment, a native authentication user may be assigned to one or more security groups. A native authentication is authentication used in conjunction with native security groups. A native authentication user is one that belongs to one or more native security groups. A native authentication user can be an employee of a customer.

Native authentication security group is a group that includes the authorization to change passwords. For example, native security group, NA-NATIVEAUTH 301, is assigned at least two authentication rights concerning change password 303. A first authentication right is to access the password— and may be associated with the group via checkbox 305. A second authentication right is to save the password, and may be associated with the group via checkbox 307. Accordingly, when an administrator is finished adding or changing authentication rights to NA-NATIVEAUTH native security group, the information may be stored to a database accessible by the native authentication server, for example, native authentication server 207 for FIG. 2. The authorization to change passwords may be a hybrid authentication right established when two bits or other binary values are set affirmatively for a native security group to indicate both the read authentication right and the write authentication right with respect to passwords. A native authentication server is a server that performs authentication functions without relying on the LDAP standard. It is appreciated that additional data structures and corresponding user interfaces may be substituted for the one just described. For example, the authorization to change passwords may be a single bit setting that a data processing system relies on to determine if both read and write authentication rights are set.

An authentication right is an authorization of a user or a group to access a data processing system feature, such as, for example, data, resources to manipulate data, I/O devices, and the like. An authentication right may be complete, in which case the user may access all data of a data processing system. The authentication right may be limited, to specific data, specific times, or specific hardware. For example, a user may be authorized with authentication rights to change passwords, and create new user accounts.

Figure 3B:
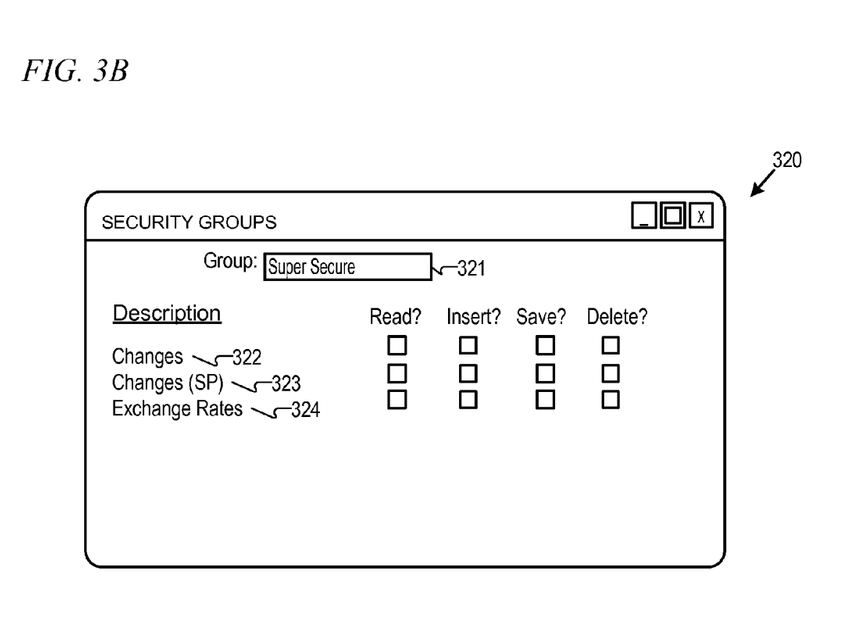
FIG. 3B is a user interface for defining an LDAP security group in accordance with an illustrative embodiment of the invention.

FIG. 3B is a user interface for defining an LDAP security group in accordance with an illustrative embodiment of the invention. A Lightweight Directory Access Protocol (LDAP) security group is defined according to the LDAP standard. In contrast with the native authentication server user interface, the user interface 320 used for setting an LDAP security group, such as Super Secure 321, does not set permissions to change passwords. Accordingly, a user interface for setting LDAP security may permit changes or other access to changes 322, changes (SP) 323, and Exchange rates 324.

Figure 3C:
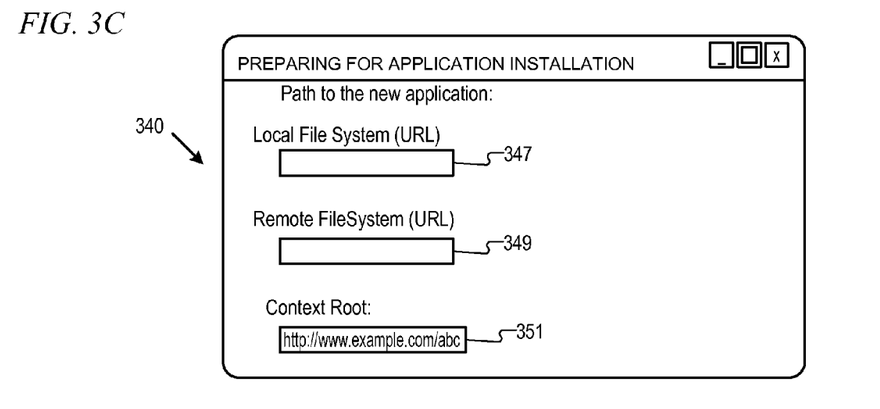
FIG. 3C is a user interface for configuring a URL for LDAP authentication to access the LDAP (authentication) web application in accordance with an illustrative embodiment of the invention.

FIG. 3C is a user interface for configuring a URL for LDAP authentication to access the LDAP (authentication) web application in accordance with an illustrative embodiment of the invention. User interface 340 permits one to use authentication configurator to set up a new application to rely on an authentication server. User interface 340 permits an administrator to provide a local file system to local file system field 347. Alternatively, an administrator may enter a remote file system URL to a remote file system URL field 349. The local and remote file system URL textboxes refer to the location of the application that is to be installed. The application can either be local on the computer's hard drive, or remote on an external server.

Figure 3D:
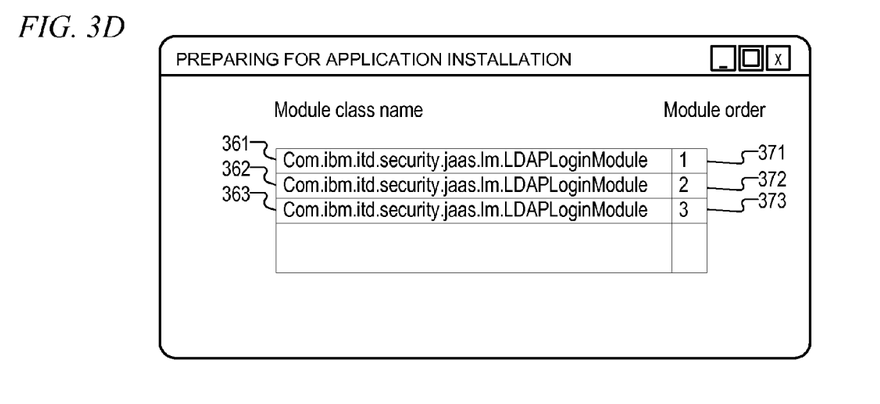
FIG. 3D is a user interface for identifying an LDAP chain in accordance with an illustrative embodiment of the invention.

FIG. 3D is a user interface for identifying an LDAP chain in accordance with an illustrative embodiment of the invention. LDAP login module 361 is identified to be first in the hierarchy with hierarchy order 1 371. LDAP login module 362 is identified to be second in the hierarchy with hierarchy order 2 372. LDAP login module 363 is identified to be third in the hierarchy with hierarchy order 3 373. In other words, a first LDAP server URL can be tested first, and a second LDAP server URL can be tested second. For each row, a user or administrator may enter the field for the module class name, as well as for the module order. Each LDAP login module can be an instance associated with an LDAP server, suffix filter and the like. Such details can be reached through a context-sensitive help popup dialog accessible through, for example, a mouse click. A JAAS (Java Authentication and Authorization Service) method is executable program code executing in a data processing system according to Java code syntax. The JAAS method may specify how vendor-supplied login modules interface to applications such as web applications. The JAAS method can specify which user is assigned to specific permissions. In the examples given in FIG. 3D, JAAS methods are shown. It is appreciated that other suitable methods for authentication may also be used. One alternative example can be the .NET framework offered by Microsoft Corp.

Figure 3E:
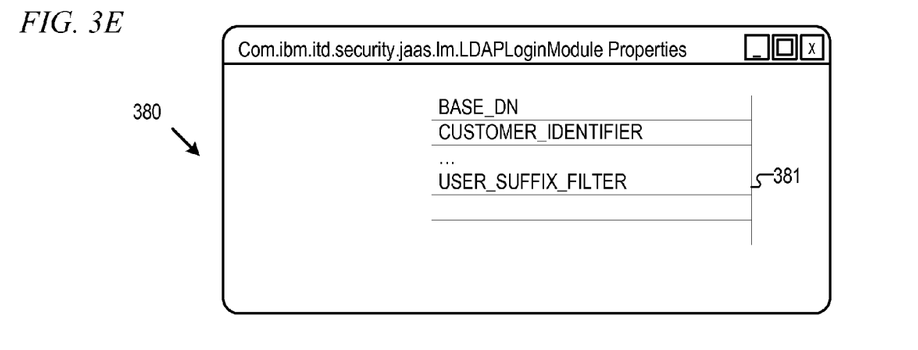
FIG. 3E is a user interface for entering user suffixes corresponding to one or more LDAP authentication servers in accordance with an illustrative embodiment of the invention.

FIG. 3E is a user interface for entering user suffixes corresponding to one or more LDAP authentication servers in accordance with an illustrative embodiment of the invention. User interface 380 permits an administrator to enter a suffix to match user IDs so that if the suffix does not match, the authentication credentials are not attempted against that LDAP server. Accordingly network traffic can be reduced. Such a suffix can be implemented, for example, in a JAAS module, at a USER_SUFFIX_FILTER field 381.

It is appreciated that the user interfaces in FIGS. 3A-3E may equally well be accomplished by a configuration file that defines values for each term or parameter described in the user interfaces. Such a configuration file may be made and changed through the operation of the user interfaces. Alternatively, more flexible navigation may be accomplished by an administrator directly editing the file with a text editor, or any other suitable editor. In other words, the use and operation of the user interfaces is an optional embodiment that may be used to populate the configuration file or other data structure upon which the flowchart in FIG. 4 may interact with and operate based upon.

Figure 4:
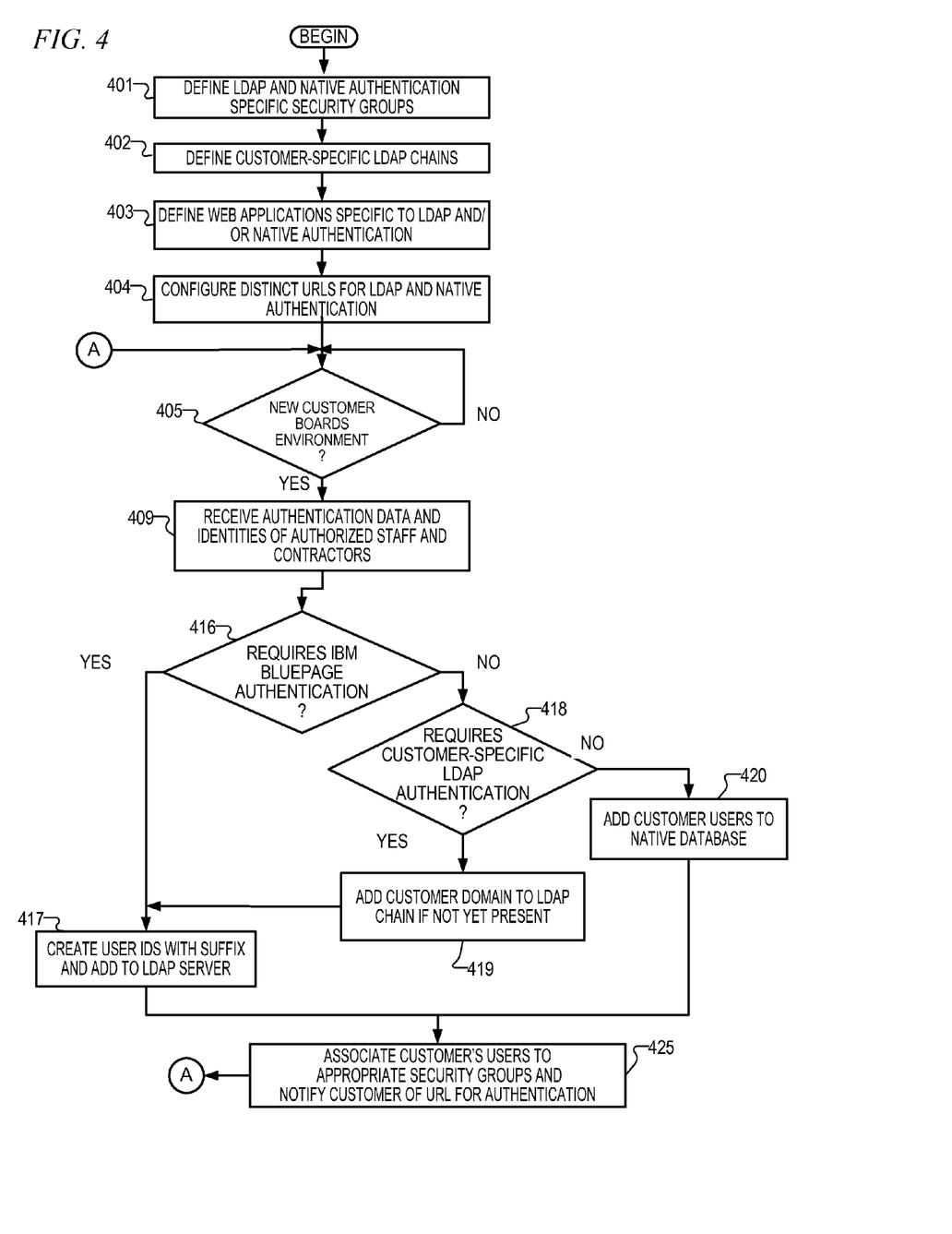
FIG. 4 is a flowchart of steps performed by an authentication configurator in accordance with an illustrative embodiment of the invention.

FIG. 4 is a flowchart of steps performed by an authentication configurator in accordance with an illustrative embodiment of the invention. Initially, an authentication configurator may define LDAP and native authentication specific security groups (step 401). These security groups may be established using a user interface such as user interface 300 of FIG. 3A or user interface 320 of FIG. 3B, for native authentication group and an LDAP authentication group, respectively. In other words, an administrator may enter, and the authentication configurator may receive the LDAP and native authentication details.

Next, the authentication configurator may define customer-specified LDAP chains 402. As explained above, the LDAP chains may be organized to provide a hierarchy of methods to authenticate a user. A customer-specified LDAP chain is an LDAP chain organized to suit the needs of a customer. Such a chain may be selected depending on the customer that requests authentication. For example, in FIG. 2, an LDAP server may be provided with a criteria to test before it attempts to authenticate a user. The criteria can be stored to a system tunable attribute called USER_SUFFIX_FILTER, for example, as described at USER_SUFFIX_FILTER 381 in FIG. 3E. The criteria can be *abc.com, where the wild-card '*' may operate as a place-keeper, and the remainder of the string can be treated as a suffix to which a login-id must match, before the LDAP server 1 221 authenticates. Absence of a match with the suffix may cause the LDAP server 1 to refer the request for authentication to the next LDAP server in the list, namely, in this case, LDAP server 2 223. LDAP server 2 may be configured to authenticate on the criteria *xyz.com. Accordingly, in the case that xyz.com is not present in the login ID, the authentication request may be referred to LDAP server 3 225. Applicable suffixes for each LDAP server may be entered according to the user interface 380 of FIG. 3E.

Next, the authentication configurator may define web applications specific to LDAP or native authentication (step 403). Such applications can be defined by an administrator identifying the URL where such web applications may be logically found. See FIG. 3C for example, specifically, the context root parameter.

Next, the authentication configurator may configure distinct URLs for LDAP and native authentication (step 404).

Next, the authentication configurator may determine whether a new customer boards the service management environment (step 405). A customer boards the service management environment in response to the customer agreeing to commercial terms concerning the operation and maintenance of IT resources, including, for example, web applications. The authentication configurator may make this determination by receiving data concerning the configuration and/or requirements of the customer's data processing system resources, staff, and/or contractors.

Boarding can take many forms. Customer boarding may include a user agreeing to terms of service, and submitting an electronic form specifying the particulars of the customer. Accordingly, a customer boarding is the data concerning the agreement, either stored or received to an authentication configurator. Customer boarding can include the addition of configuration data in a configuration file that includes the details that identify customer status for purposes of performing steps 416, 417, 418, 419, 420 and/or 425, below.

Next, the authentication configurator may receive authentication data and identities of authorized staff and/or contractors (step 409). This step operates based on the customer delivering or otherwise making available such authentication data and identities of authorized staff and/or contractors. Authentication data includes at least the identity of a user and password or other key. Authentication data can include additional information, such as the name of a user, the role, or title of the user, a security group to which the user belongs, and the like.

Further steps of the authentication configurator can be one or more steps to assess the customer authentication requirements. Assessing can include determinations of whether LDAP server authentication is required by the customer. This determination is made at steps 416 and/or 418, below.

Next, the authentication configurator may determine whether the customer requires IBM BluePages authentication (step 416). Alternatively, step 416 may determine if some other LDAP server is required by the customer, for example, an OpenLDAP server. If the customer does not require IBM BluePages authentication, the authentication configurator may determine whether the customer requires customer-specified LDAP authentication (step 418). Customer-specified LDAP authentication is authentication that relies on an LDAP server selected by the customer. If the determination at step 418 is negative, the authentication configurator may add customer users to a native database 420. Otherwise, a positive determination may cause the authentication configurator to add a customer domain to an LDAP chain if such domain is not yet present in an LDAP chain (step 419). A URL for LDAP authentication is a URL that corresponds to an authentication server that implements LDAP. A URL for native authentication is a URL that corresponds to an authentication server that implements a native authentication protocol.

Collectively, steps 416 and 418 permit a customer to specify, and the authentication configurator to responsively configure an authentication requirement. An authentication requirement is a performance description that a customer requires to be met in order to support authentication. The URL can be, for example, an internet protocol address, a fully qualified domain name, etc., with or without a protocol identifier-prefix. Steps 416 and 418 may be influenced based on a binary value stored to a data structure associated with LDAP status. The binary value can be an indication of 'MAP' or of 'no LDAP'(or the absence of LDAP), depending on the needs of the customer. An indication of LDAP or NO LDAP is a signal or a memory field that is resolvable, through receiving or reading, into one of two values, namely, LDAP and NO LDAP. Accordingly, the indication can be a binary bit stored to memory, storage, or transmitted through a medium, where the binary bit corresponds to an authorized person that is authorized by the customer. Regardless of whether a customer specifies an LDAP or NO LDAP for authentication, a customer may still rely on staff who have multiple user accounts, wherein one account is LDAP authenticated, and a second user account is native database authenticated. Accordingly, such staff that hold such accounts can always be authenticated so long as the correct type of user account is used to match the customer-preferred authentication technique.

Following step 419, or a positive result to step 416, the authentication configurator may create user identifiers with a suffix and add the user identifier (or ID) to an LDAP server (step 417). Such a suffix may be selected by the customer. Note that the IBM BluePages server is a type of LDAP server. A user identity or identity of authorized staff or contractor is a name that identifies a user or person that is a contractor or staff of the customer. The identity can be a person's name, a serial number of the person, a login pseudonym for the user, and the like.

Next, or following step 420, the authentication configurator may associate customer's users to appropriate security groups and notify the customer of a URL used for authentication (step 425). An appropriate security group is a determination made by the customer and directly or indirectly provided to the authentication configurator at step 425. Further processing may continue at step 405.

Re-iteration of steps following 405, accessed by a positive determination at step 405, involves the boarding or addition of further customers to the service management environment.

Accordingly, one or more embodiments may permit a vendor to a customer to prepare a service management environment to authenticate customer employees and contractors to access web applications of the customer by way of initially authenticating such employees and contractors using the required methods of the customer. The embodiments permit additional flexibility to authenticate such persons using either LDAP authentication or native authentications, depending on the situation. Such flexibility in boarding customers can allow follow-through after boarding to be fast and transparent.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer usable or computer readable medium, or a computer readable storage device providing program code for use by or in connection with a computer or any instruction execution system. For the purposes of this description, a computer usable or computer readable medium can be any tangible apparatus that can store the program for use by or in connection with the instruction execution system, apparatus, or device.

The storage device can be an electronic, magnetic, optical, electromagnetic, infrared, or semiconductor system (or apparatus or device). Examples of a computer readable storage device include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories, which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for authentication of customers, the method comprising the steps of:
   receiving a definition of a Lightweight Directory Access Protocol (LDAP) security group for LDAP authentication, wherein the LDAP security group is associated with authentication rights;
   receiving a definition of a native security group for native authentication users, wherein the native security group has at least one authentication right not present in the LDAP security group;
   receiving a customer specification of a list of LDAP servers that are used to successively reject a request for authentication until one of the LDAP servers grants authentication;
   configuring an LDAP authentication web application and a native authentication web application to connect to a service management database, and configuring the LDAP authentication web application to use the list of LDAP servers;

configuring a first Uniform Resource Locator (URL) for LDAP authentication to access the LDAP authentication web application;

configuring a second URL for native authentication to access the native authentication web application;

assessing authentication requirements of a customer;

responsive to assessing, creating a user identifier;

responsive to creating the at least one user identifier, associating the at least one user identifier with a security group selected from a group consisting of the LDAP security group and the native security group; and responsive to assessing, notifying a customer of a customer URL selected from the group of URLs consisting of the first URL and the second URL, to use for authentication.

2. A computer program product for authentication routes of customers, the computer program product comprising:

a computer readable storage device;

first program instructions to define a Lightweight Directory Access Protocol (LDAP) security group for LDAP authentication, wherein the LDAP security group is associated with authentication rights;

second program instructions to define a native security group for native authentication users, wherein the native security group has at least one authentication right not present in the LDAP security group;

third program instructions to define customer-specified LDAP chains;

fourth program instructions to configure a first Uniform Resource Locator (URL) for LDAP authentication to access the LDAP authentication web application;

fifth program instructions to configure a second URL for native authentication to access the native authentication web application;

sixth program instructions to assess authentication requirements of a customer;

seventh program instructions to create a user identifier, responsive to assessing;

eighth program instructions to associate the at least one user identifier with a security group selected from a group consisting of the LDAP security group and the native security group, responsive to creating the at least one user identifier;

ninth program instructions to notify a customer of a customer URL selected from the group of URLs consisting of the first URL and the second URL, to use for authentication, responsive to assessing; and wherein the first, second, third, fourth, fifth, sixth, seventh, eighth and ninth program instructions are stored on the computer readable storage device.

3. A computer system for authentication of customers, the computer system comprising:

a processor, a computer readable memory and a computer readable storage device;

first program instructions to receive a definition of a Lightweight Directory Access Protocol (LDAP) security group for LDAP authentication, wherein the LDAP security group is associated with authentication rights;

second program instructions to receive a definition of a native security group for native authentication users, wherein the native security group has at least one authentication right not present in the LDAP security group;

third program instructions to receive a customer specification of a list of LDAP servers that are used to successively reject a request for authentication until one of the LDAP servers grants authentication;

fourth program instructions to configure a first Uniform Resource Locator (URL) for LDAP authentication to access the LDAP authentication web application;

fifth program instructions to configure a second URL for native authentication to access the native authentication web application;

sixth program instructions to assess authentication requirements of a customer;

seventh program instructions to create a user identifier, responsive to assessing;

eighth program instructions to associate the at least one user identifier with a security group selected from a group consisting of the LDAP security group and the native security group, responsive to creating the at least one user identifier; and ninth program instructions to notify a customer of a customer URL selected from the group of URLs consisting of the first URL and the second URL, to use for authentication, responsive to assessing; and wherein the first, second, third, fourth, fifth, sixth, seventh, eighth and ninth program instructions are stored on the computer readable storage device for execution by the processor via the computer readable memory.

* * * * *